United States Patent [19]
Wuest

[11] 3,783,609
[45] Jan. 8, 1974

[54] METHOD AND APPARATUS FOR REMOVING THE BURR OF CHAIN-LINKS

[75] Inventor: Toni Wuest, Cologne, Germany

[73] Assignee: Meyer, Roth & Pastor, Maschinenfabrik GmbH, Koln, Germany

[22] Filed: Mar. 13, 1972

[21] Appl. No.: 234,352

[30] Foreign Application Priority Data
Mar. 11, 1971 Germany.................. P 21 11 659.6

[52] U.S. Cl............................ 59/35, 59/29, 90/24 A
[51] Int. Cl.............................................. B21l 15/00
[58] Field of Search................. 90/24 A, 24 C, 24 E; 83/914; 59/29, 35

[56] References Cited
UNITED STATES PATENTS
2,806,345  9/1957  Phares ..................................... 59/29

FOREIGN PATENTS OR APPLICATIONS
992,789    5/1965   Great Britain ..................... 90/24 C
993,206    5/1965   Great Britain ..................... 90/24 C
738,998   10/1955   Great Britain ........................ 59/29
1,454,276 11/1965  France .................................... 59/29

*Primary Examiner*—Andrew R. Juhasz
*Assistant Examiner*—Z. R. Bilinsky
*Attorney*—John C. Holman et al.

[57] ABSTRACT

A method and apparatus for fully removing weld-burrs from a workpiece formed by butt-welding two sections end to end, such as a welded chain link. The weld-burr which extends annularly of the workpiece cross-section is removed by shearing the burr into two diametrically opposed pieces. The method for removing the weld-burrs is applicable for any cross-section of the work-piece which is symmetrical about an axis in the plane of the cross-section. An apparatus for removal of weld-burrs uses a fork-shaped tool having two cutting edges formed at the ends of in-turned members provided one each at the free ends of the fork-shaped tool. The tool is expediently pivotally mounted so as to be capable of controlled oscillatory movement about an axis perpendicular to a plane containing the two limbs of the fork. The apparatus also incorporates means to move and retract the fork-shaped tool in a direction parallel to the length of the workpiece so that the removal of the weld-burr is effected by longitudinal shear strokes of the cutting edges which are successively made to engage diametrically opposite sides of the welded cross-section of the workpiece.

6 Claims, 5 Drawing Figures

PATENTED JAN 8 1974        3,783,609

METHOD AND APPARATUS FOR REMOVING THE BURR OF CHAIN-LINKS

The instant invention concerns a method and apparatus for the complete removal of the burr on chain links.

According to a commonly known method as carried out by a known apparatus, the complete removal of the burr on chain links is made by a cutter covering 180° of the outer periphery of the wire cross section of the link, whereby the cutter is moved forward over the burr, thereby shearing off in the longitudinal direction the respective outer part of the burr. The cutter is provided at the ends of its segmental cutting edge with two additional cutting edges which are in the longitudinal direction of the trimming process, i.e., according to the surface line of the chain link, the additional cutting edges remain in the area of the burr after completion of the removal of the outer peripheral section of the burr so that the two remaining inner quadrants of the burr can be removed through the tilting of the trimming cutter in opposite directions.

This prior art method and apparatus have a number of disadvantages. Firstly, the removing of the burr is performed in two different movements, namely, the first through the pushing in the longitudinal direction, and the other through pealing off in the peripheral direction, so that after a certain period of use of the cutters on the workpiece there develop longitudinal and peripheral hairlines which could result in undesirable notch effects which decrease the strength of the links during the bending. This is especially true in regard to the peripheral notches. Thus, it is the object of the instant invention to prevent the forming of such peripheral notches and to remove the entire burr by pushing in the longitudinal direction.

A further disadvantage exists in that the surface of the links is not uniform since the tolerances and the difficulty in the production of the three cutting edges cause the developing of set-offs on a cutter. A further disadvantage consists in that the stress-directions are subject to change, for the tool-device as well as for the workpiece and its mounting support on the seat, which is caused by bulging steels etc. so that there may also easily be expected that positional changes and incorrect woking areas may result. Finally, these disadvantageous conditions cause the premature wearing out of the operating parts for the trimming cutter.

It is a further object of the instant invention to remove these disadvantages.

When using the prior art apparatus, it has been proven that the outer part of the burr which was first removed, and in the case where a vertical link is concerned, remains hanging on the link especially in light of the fact the trimming process takes place on the still warm chain link, so that retraction during the cooling causes the burr to adhere with especially disadvantageous rigidity. It is the object of the instant invention to overcome this disadvantage and to provide for the immediate and complete removal of the burr from the link.

The instant invention therefore proposes that two 180° weld sections which are located lateral of the periphery at the center of the link, be removed through longitudinal pushing.

Obviously, all disadvantages, especially those which develop in the link itself and those caused by the adhering of the removed weld-burrs, are reliably overcome. The link has only longitudinal notchings which will not cause corrosion or notch effects, the stress during the removal of the burr is always made in the longitudinal direction, even though this may occur in the reverse direction so that a reliable holding of the link is guaranteed and premature wear of the operating mechanism for the trimming cutter is avoided.

A further advantage is that after the removal of the partial burrs they are able to reliably fall off laterally, whereby it is possible to provide for a space-saving arrangement for the removal or catching of these burrs.

The apparatus for performing the instant inventive method may be provided with a blade-fork which is movably arranged in the direction of the lateral axis of the link to move forward and perpendicular to the center periphery of the link, the blade-fork being provided at each of its fork-ends with a trimming cutter covering half of the periphery of the link. The utilization of these trimming cutters, which are operated subsequently, will provide for an even and precise treatment of the weld-area, while the arrangement of the cutters on one integral fork simplifies the device so that the cutting edges of the cutters are fixedly secured and function free of vibration. The fork may thereby retain its vertical travel to the center periphery of the link through a rectilinear displacement. It is, however, especially advantageous to tilt the fork on an axis which is parallel to the plane of the link and located preferably, for symmetrical reasons, in this plane, whereby it is furthermore recommended to provide this axis with a part, such as a sliding carriage or a similar device, through which it obtains the perpendicular movement.

Finally, it is advantageous for simplifying the movements to position the cutting ends of the two cutters in opposite directions so that during the forward stroke one half of the weld-burr can be removed and during the reverse stroke the other half of the weld-burr is longitudinally removed.

The instant invention is explained in an exemplary embodiment which shows an apparatus for performing the method in schematic illustration, whereby FIG. 1 represents a top view of the apparatus in the starting position;

Figure 1:
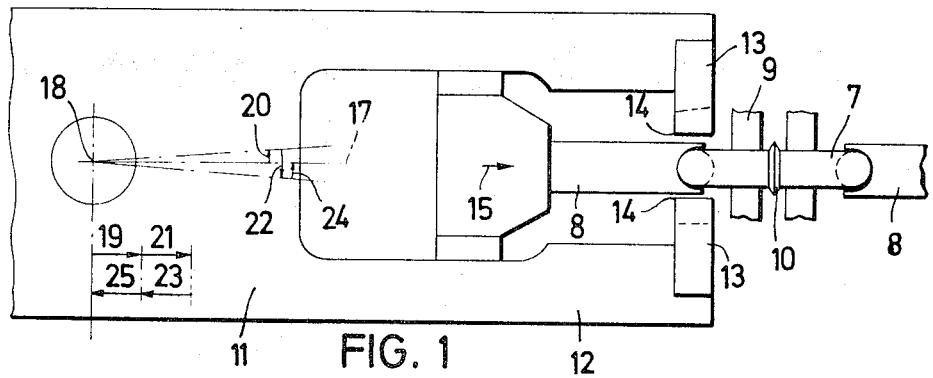

A chain link 7 is secured by means of upsetting steels 8 on a seat (not shown), whereby the electrodes 9 are installed and the weld-burr 10 is formed. The inventive apparatus, having an operating mechanism (not shown), comprises cutter-fork 11 with two integral fork-ends 12, on which are mounted two trimming cutters 13. The cutters are of identical design but the cutting edge 14 of one cutter points forward, and that of the other cutter points backwards.

Figure 2:
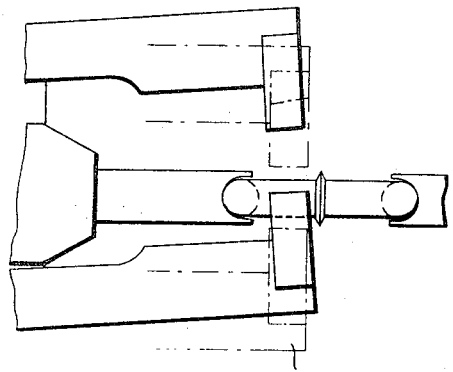
FIG. 2 illustrates the apparatus in a forward position by broken lines as well as in the ready-position for the first trimming phase by means of solid lines.
Figure 3:
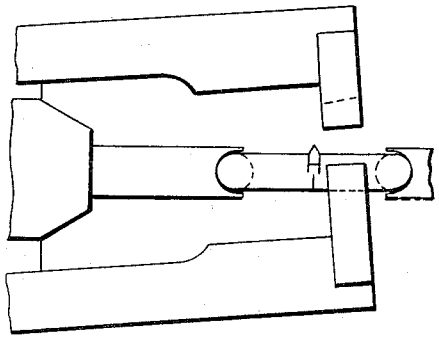
FIG. 3 shows the apparatus after completion of the first weld section removal phase.

FIG. 2 illustrates the manner in which the fork is tiltable from the forward position 16 after the return of the electrodes 9, as indicated by the solid lines.

Figure 4:
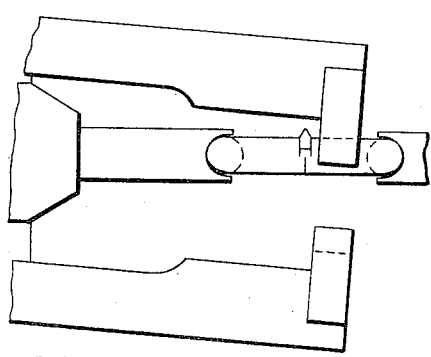
FIG. 4 shows the apparatus in a ready position before the second working phase.
Figure 5:
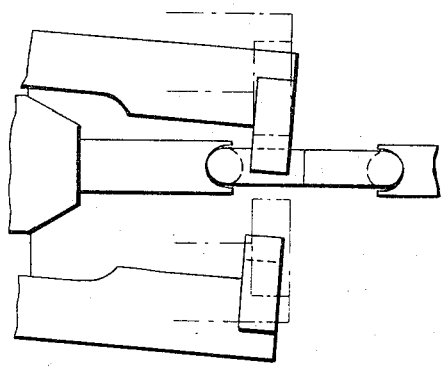
FIG. 5 shows the apparatus after completion of the second weld-section removal process in full line illustration as well as a view of the center position indicated by broken lines.

FIG. 2 illustrates the manner in which the fork is moved into the half-way forward extended position 16 after the electrodes 9 are retracted, and is thereafter tilted on the axis 18 located in the extended center plane 17 of the link, as may be seen in FIG. 1. The forward moving into the position 16 (FIG. 2), and the subsequent tilting movement in the sense of the arrow 20 (FIG. 1) prepares the apparatus for the first trimming. The first trimming is made in the direction of the arrow 21 and the fork is then tilted in the direction of the arrow 22 by double the angle as before so that now the other cutter arrives at the position, as shown in FIG. 4. The working stroke for the removal of the second half of the burr is subsequently made in the direction of the arrow 23, followed by a backward tilting of the fork in the direction of arrow 24 so that the center position of the fork is again obtained, which then is pulled back into the starting position in the direction of arrow 25.

Since the various movements are made via short distances and the number of forks and cutters which will have to be moved is relatively small, the entire working process with its seven movements may be performed within a very short time.

The trimming process is accordingly performed on one hand in the sense of a pushing- and on the other hand in the sense of a pulling-motion, the operational directions of the two steps are thus performed in opposite directions. It may be desired to avoid the movement in opposite directions, for example, because the construction of the fork and the operating mechanism should be of a light weight. To guarantee the highest possible rigidity during the working process in only one direction, for example, the direction of the push, the cutters are arranged fully symmetrical to the center plane of the link and have their cutting edges arranged at the front of the two cutters. Firstly, then, a forward push in direction of the arrow 19 is performed, then tilted in the direction of arrow 20, and the first half of the burr is removed according to arrow 21. Then the fork is moved back in the direction of arrow 22 but only to the center position of the fork. The fork is then again moved back into the starting position 16 according to FIG. 2, and then the second tilting motion according to arrow 22 is performed, however, by a half-angle value, then the second half of the working phase is performed in the direction of arrow 21. This is followed by a tilting back into the starting position according to arrow 24; the fork is then again moved back into the starting position.

The instant inventive method and the inventive apparatus provide for the special advantages in that not only chain links having circular cross-sections but also those with other cross-sections, as for example having oval or polygonal cross-sections, but also those having intricate cross-sections as for example, dual-T, may be treated. The cross-section must be symmetric to the center plane of the link or to the plane which goes through the tilting axis of the fork. For this reason, the instant inventive method and an accordingly constructed apparatus may also be utilized for the trimming of weld-burrs on open lenghts, whereby the working strokes 19 and 25 may be eliminated, since the return-pulling of the fork-levers into a starting position outside the chain link is no longer required.

What is claimed is:

1. A method for removing the peripheral weld-bead extending 360° about a butt-welded workpiece such as a portion of a chain link or the like, comprising the steps of:
   A. positioning an elongated workpiece having a peripheral weld-bead between a pair of integrally mounted, diametrically opposed cutters having cutter edges complimentary to one-half the periphery of the workpiece and disposed normal to the workpiece;
   B. moving one cutter edge in juxtaposition on the workpiece and complimentary to one-half the periphery thereof, while simultaneously moving the other;
   C. moving the workpiece and cutter edge longitudinally relative to each other and shaving off one-half the weld-bead burr from one side of the workpiece;
   D. disengaging the first cutter edge from the workpiece and simultaneously engaging the other cutter edge in juxtaposition with the opposite side of the workpiece; and
   E. again moving the other opposed cutter edge and workpiece longitudinally relative to each other and shaving off the remaining half of the weld-bead so that the workpiece is completely dressed in two longitudinal bead-shaving strokes.

2. In apparatus for removing a peripheral weld-bead from an elongated, butt-welded workpiece comprising:
   a one-piece fork comprising mutually parallel limb-portions disposed in spaced relation from a longitudinal axis of symmetry;
   means mounting said fork on a pivot axis perpendicular to the axis of symmetry and passing through the axis of symmetry,
      said limb portions including terminal portions directed toward the longitudinal axis of symmetry and terminating short thereof and forming a gap therebetween,
      said terminal portions including cutting edges each having a periphery complimentary to one-half of the cross section of the workpiece from which the peripheral weld-bead is to be removed;
   said terminal limb portions being positionable through pivotal movement of the one-piece fork for movement toward and away from the axis of symmetry of the fork;
   means for mounting the workpiece on the longitudinal axis of symmetry of the work whereby the weld-bead projects laterally of the workpiece; and
   means for reciprocating the fork in its angularly adjusted positions whereby at least one of the cutter edges engages the outer priphery of the workpiece whereby the weld-bead can be removed through two longitudinal strokes of the fork with respect to the workpiece.

3. The structure as claimed in claim 2 in which the cutter edges are provided on opposite sides of the terminal portions of the limbs whereby the longitudinal strokes of the fork for removing the weld-bead are effected in successive opposed directions.

4. The structure as claimed in claim 2 in which the cutter edges are provided on a common side of the terminal portions of the limbs whereby the longitudinal strokes of the fork for removing the weld-bead are effected in a common direction.

5. The method as claimed in claim 1 characterized by effecting the longitudinal shaving stokes in opposite directions.

6. The method as claimed in claim 1 characterized by effecting the longitudinal shaving strokes in a common direction.

* * * * *